United States Patent
Gallant

(10) Patent No.: US 7,289,522 B2
(45) Date of Patent: Oct. 30, 2007

(54) SHARED DEDICATED ACCESS LINE (DAL) GATEWAY ROUTING DISCRIMINATION

(75) Inventor: John Kenneth Gallant, Plano, TX (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1067 days.

(21) Appl. No.: 10/097,971

(22) Filed: Mar. 15, 2002

(65) Prior Publication Data

US 2002/0136370 A1  Sep. 26, 2002

Related U.S. Application Data

(60) Provisional application No. 60/276,923, filed on Mar. 20, 2001, provisional application No. 60/276,953, filed on Mar. 20, 2001, provisional application No. 60/276,954, filed on Mar. 20, 2001, provisional application No. 60/276,955, filed on Mar. 20, 2001.

(51) Int. Cl.
  *H04Q 11/00* (2006.01)
(52) U.S. Cl. ................ 370/401; 370/352; 370/471
(58) Field of Classification Search ............. None
  See application file for complete search history.

(56) References Cited

U.S. PATENT DOCUMENTS

| | | | |
|---|---|---|---|
| 6,018,575 A | 1/2000 | Gross et al. | |
| 6,128,379 A | 10/2000 | Smyk | |
| 6,252,952 B1 | 6/2001 | Kung et al. | |
| 6,731,642 B1* | 5/2004 | Borella et al. | 370/401 |
| 6,822,957 B1* | 11/2004 | Schuster et al. | 370/389 |
| 2005/0165894 A1* | 7/2005 | Rosenberg et al. | 709/205 |

OTHER PUBLICATIONS

Hamdi, et al., "Voice Service Interworking for PSTN and IP Networks", IEEE Communications Magazine, vol. 37, Issue 5, May 1999, pp. 104-111.
"Technical Considerations for Convergence Data, Voice and Video Networks", Cisco Systems Whitepaper, Copyright 2000, pp. 1-14.
"Cisco AS5300/Voice Gateway Data Sheet", Cisco Systems, Copyright 1999.
Schulzrinne et al., "SIP Call Control Services", Internet Engineering Task Force, Internet Draft, Jun. 17, 1999.
Falstrom, P., "E.164 Number and DSN", Internet Engineering Task Force, Request for Comments 2916, Sep. 2000.
Schulzrinne et al., "RTP: A Transport Protocol for Real-Time Applications", Internet Engineering Task Force, Request for Comments 1889, Jan. 1996.
Handley et al., "SIP: Session Initiation Protocol", Internet Engineering Task Force, Request for Comment 2543, Mar. 1999.

* cited by examiner

*Primary Examiner*—Duc Ho

(57) ABSTRACT

An approach for providing telephony services over a data network is disclosed. A communication system includes a gateway that receives a signal to establish a call with a called station from a calling station in a telephone network (such as a Class 3 network) associated with one of a plurality of customers. The gateway generates a message according to a prescribed application layer protocol to establish the call with the called station over the data network. The message includes an alias host address identifying the one customer. The system also includes a server that receives the message from the gateway and to route the call to the called station based upon the alias host address.

57 Claims, 6 Drawing Sheets

SHARED DEDICATED ACCESS LINE (DAL) GATEWAY ROUTING DISCRIMINATION

RELATED APPLICATIONS

This application claims priority under 35 U.S.C. §119(e) based on U.S. Provisional Application Ser. Nos. 60/276,923, 60/276,953, 60/276,954, and 60/276,955, all filed Mar. 20, 2001; the disclosures of which are incorporated herein by reference.

FIELD OF THE INVENTION

The present invention relates to a communications system, and is more particularly related to providing voice communication services over a data network.

BACKGROUND OF THE INVENTION

The proliferation of data transport networks, most notably the Internet, is causing a revolution in telephony and other forms of real-time communication. Businesses that have been accustomed to having telephony traffic and data traffic separately supported over different systems and networks are now moving towards so-called "converged networks" wherein telephone voice traffic and other forms of real-time media are converted into digital form and carried by a packet data network along with other forms of data. Now that the technologies are feasible to support it, voice over data transport offers many advantages in terms of reduced capital and operating costs, resource efficiency, and flexibility.

For example, at commercial installations, customer premise equipment investments are substantially reduced as most of the enhanced functions, such as Private Branch Exchange (PBX) and automatic call distribution functions, may reside in a service provider's network. Various types of gateways allow for sessions to be established even among diverse systems, such as IP phones, conventional analog phones and PBXs, as well as with networked desktop computers.

To meet the demand for voice over data transport, service providers and network equipment vendors are faced with the challenges of establishing new protocols and standards, recognizing new business models, implementing new services, and designing new equipment in a way that would have been difficult to imagine twenty years ago.

For example, a new generation of end user terminal devices are now replacing the traditional telephones and even the more recent PBX phone sets. These new sets, such as those offered by CISCO SYSTEMS, Inc. and PINGTEL Corporation, may connect directly to a common packet data network, via an Ethernet connection for example, and feature large visual displays to enhance the richness of the user interface.

Even before such devices were developed, computers equipped with audio adapters and connected to the Internet were able to conduct some rudimentary form of Internet telephony, although the quality was unpredictable and often very poor. The emphasis now is upon adapting Internet Protocol (IP) networks and other packet transport networks to provide reliable toll-quality connections, easy call set-up and enhanced features to supply full-featured telephony as well as other forms of media transport. Some other types of media sessions enabled by such techniques may include video, high quality audio, multi-party conferencing, messaging, and collaborative applications.

Of course, as a business or residential communications subscriber begins using such voice-over-packet communications to replace conventional telephony, there will naturally be an expectation that the quality of the connections and the variety of services will be at least as good as in the former telephone network. In terms of services, for example, some businesses have come to rely upon PBX features or network-resident "Centrex" features such as call forwarding and conditional call handling. In the near future, such special services are expected to see increased use because the new terminal devices mentioned earlier can provide a much more intuitive interface for the users. With existing systems, users often forget which combinations of keystrokes are required to invoke enhanced features.

For establishing a communications session in a network, new protocols and control architectures have emerged. It is worth noting that these have been inspired by the migration to a voice over data, but are not necessarily limited to such an environment. In some respects the protocols and control architectures described next may be used to establish calls through any form of transport.

One example of an approach for establishing a communications session among terminals connected to a network is the H.323 set of standards promulgated by the ITU (International Telecommunications Union). Another example is the Session Initiation Protocol (SIP) put forth by the IETF (Internet Engineering Task Force). The SIP protocol is described in IETF document RFC 2543 and its successors. Various architectures have been proposed in conjunction with these protocols with a common theme of having an address resolution function, referred to as a "location server," somewhere in the network to maintain current information on how to reach any destination and to control features on behalf of users.

For large scale-deployment of voice over data transport as well as other real-time communications, it is essential that the network control architectures be extremely robust and highly scalable to reliably accommodate millions of sessions on a daily basis. Robustness may necessitate designing in redundancy and failover mechanisms. Preferably, these measures will even provide transparent continuity of existing sessions and features even if a failure occurs in the midst of a session. For ensuring this level of reliability and for maximizing scalability, it is generally preferable to minimize the demand upon control functions, such as location servers, to maintain any persistent state information for each call in the network. Consequently, many of the control and signaling communications for accomplishing network services are designed to be self-contained, meaning that they carry sufficient context information to avoid relying upon state persistence in the servers handling the messages.

The integration of voice and data services relies on the capability to interface different communications systems, particular those systems that have been traditionally strictly telephony-orient or strictly data communications oriented. One approach is to deploy gateways to provide such a capability. In the context of real-time communications, a gateway is generally a device that adapts signaling and media-bearing channels from one type of network to another type.

A good example of this function is a so-called "network gateway" which adapts a packet telephony network to a Public Switched Telephone Network (PSTN). At least two aspects of adaptation must take place. For signaling, the Signaling System 7 (SS7) or similar signaling employed in the PSTN must be mapped to SIP or similar messaging in the packet network so that the two networks can cooperatively establish a connection. For the media or bearer channel, the analog or Pulse Code Modulation (PCM)-encoded voice signals need to be converted into packetized data amenable to the packet transport network.

Another type of gateway is the so-called "DAL gateway". A DAL (Dedicated Access Line) is commonly known in traditional telephony as a means for a communications customer, such as a business enterprise, to connect directly to a core telephony switch, such as a Class 3 switch, through a trunk line. A DAL connection may be viewed as bypassing a Class 5 end-office switch, which is more suitable for serving individual (residential) subscriber loops. A DAL is often used to support customers of VPN (Virtual Private Network) services having large numbers of phones and numerous sites. Large business customers often have PBX's which couple to the Class 3 switch network through T1 lines or the like. VPN customers have private dialing plans, that is, dialing prefixes that are independent of the geographically-based exchange prefixes used in the public telephone network.

As described herein, a DAL gateway is a device whereby a user who is not at a location directly served by VPN services may nevertheless reach the VPN facilities and dial according to the VPN dialing plan. For example, an employee of a large company may be familiar with the internal telephone numbers of other employees at other sites around the country. When away from the VPN-served workplace, the employee may use a conventional phone in the PSTN network to reach the VPN and place calls within the company using the internal company dialing plan. This is accomplished by dialing a special telephone number to reach the gateway and entering an authorization code and a VPN-context destination telephone number, whereupon the gateway will patch the call through the VPN to the desired party. This is especially helpful for avoiding personal long distance charges that would otherwise be incurred by the employee if they dialed remote destinations through the PSTN rather than the VPN.

As business enterprises migrate to packet telephony, there is a need to provide VPN services and, more particularly, to provide for access to VPN services from outside the packet-switched VPN environment. A DAL gateway must therefore accept calls from a conventional telephone network and connect these calls to destinations in the packet-switched using an appropriate dial plan to interpret the dialed number.

FIG. 6 is a diagram of a conventional approach wherein multiple DAL gateways are used to service multiple enterprise customers. In system 600, a number of gateways 601, 603, 605 interface to a network 609 comprising telephone switches, exemplified by Class 3 switch 607. Switch 607 provides multiple DAL trunks corresponding to multiple Private Branch Exchanges (PBXs) 617, 619, 621. Each of these private telephone networks 617, 619, 621 may be representative of enterprises having VPN services provided through network 609 and data network 627. Each such enterprise may employ private numbering plans within their respective network configurations. Routing of calls within an enterprise is performed in the context of the particular dialing plan. Accordingly, it is acceptable for different enterprises to have some identical internal telephone numbers because these will actually be routed differently based on the respective enterprise dialing plans.

Class 3 networks, such as the network 609, commonly use two different types of routing. One form of routing is based on explicitly specifying the destination switch ID (identification) and trunk-group. The other is based upon the number as dialed by an originator, followed by a table look-up or other logic to resolve the dialed number to a switch/trunk destination.

In FIG. 6, a SIP server 631 is coupled to gateways 601, 603, 605 through data network 627. SIP server 631 mediates the establishment of communications sessions through data network 627. In particular, SIP server 631 handles request for sessions by first determining the data network addresses of points that need to communicate and then coordinating the establishment of communications between the selected points.

When a DAL gateway (e.g., 601, 603, and 605) receives a call or communications request from a calling party, such as phone 623, SIP server 631 receives a corresponding session request from the gateway to which the call was placed.

For example, assume phone 623, PBX 617, gateway 601, and SIP client 626 are all associated with the same VPN used by Company A. A caller 624 using phone 623 might try to reach SIP client 626 by dialing "222-5723". To set up the call, PBX 617 would signal to switch 607 which, based upon the identity of trunk 611, would route the call to gateway 601. Recognizing the inbound call, gateway 601 would send a SIP INVITE message, or the like, through network 627 to SIP server 631.

The address of gateway 601, which is a unique address in the realm of data network 627, would be conveyed as part of the SIP INVITE message, allowing SIP server 631 to determine which VPN-dedicated DAL gateway the call arrived through and, hence, which dialing plan to use in interpreting the dialed number and routing the call. In this case, SIP server 631 would retrieve the dial plan to determine the address of SIP client 626 as corresponding to dialed number "222-5723". To carry the actual conversation, a media session would then be established through data network 627 and be coupled through gateway 601 to a telephone channel through switch 607 and PBX 617.

Likewise, as similar sequence of events would occur if caller 629 at a second enterprise, Company B, used phone 628 to reach SIP client 625 through PBX 619, switch 607, gateway 603, and SIP server 631. It is especially important to note caller 629 might even use the same dialed number to reach SIP Client 625 that caller 624 used to reach SIP client 626, the difference being the dial plan context.

By virtue of the dialing plan context being established, it is even possible for an ordinary PSTN phone 632 to be used by either caller 624 or caller 629 to reach their respective counterparts. In this scenario, a caller 624 uses phone 632 to dial a special access number, such as a particular toll-free number, to reach gateway 601. This telephone call will be routed in the conventional manner by Class 5 end-office switch 630 and Class 3 switch 607. Upon being connected to gateway 601, the caller will be prompted by the gateway to provide authentication information and to enter the number of the party that is to be reached, namely "222-5723" to reach SIP client 626.

Caller 629 may also use phone 632, which may be a public pay phone or hotel phone, for example, to reach SIP client 625. Caller 629 first dials a special access number that is different than the one caller 624 used earlier. This access number results in the call from phone 632 being routed to gateway 603 where a similar interaction takes place to obtain the authentication and destination number information.

Thus, call requests for different companies come through different gateways. SIP server 631 determines which set of routing rules to apply, that of Company A or Company B, based upon which gateway's network address appears in the incoming INVITE request. Under this approach, each gateway is mapped to one set of customer routing rules in SIP server 631. Accordingly, calls from the switch 607 are separated according to the customers into separate gateways 601, 603, 605. As noted above, multiple gateways 601, 603, 605 are needed because each gateway 601, 603, 605 possesses a unique host address, thereby permitting the SIP server 625 to discern the particular routing rules to apply— in which the selection of these rules depends on the particular gateway.

Under this conventional arrangement, a number of drawbacks arise. First, scaling is problematic, in that a gateway is required for each individual customer to ensure proper routing of calls. Significant cost is thus incurred under this architecture, thereby reducing the competitiveness of the service provider. Further, this conventional approach is inefficient, as a gateway is constrained to one set of routing rules.

Therefore, there is a need for an approach for efficiently performing telephony services over a data communications system. Additionally, there is a need to enhance scalability. There is also a need to preserve a standard architecture to promote deployment of network services, while minimizing system complexity. There is a further need to reduce administration and operational costs.

SUMMARY

These and other needs are addressed by the present invention in which an integrated communication system provides telephony and data services over a data network. The system employs a dedicated access line (DAL) gateway that interfaces with one or more telephone networks. A single DAL gateway is shared among multiple customers or multiple VPNs, such that a user (i.e., calling party) can call into the gateway and, through two-stage dialing, enter a private phone number of another user (i.e., called party). In accordance with one embodiment, the DAL gateway generates a Session Initiation Protocol (SIP) message to a SIP server, directing the SIP server to route the call to a SIP client associated with the called party. The DAL gateway utilizes alias host addresses to identify the respective customers. These alias host addresses are stored in a Domain Name Service (DNS) server to map to a common host address—that of the SIP server. The use of customer identifiers (e.g., alias host addresses), which may be chosen based on dial numbers or switch identification (ID)/trunk-group information, provides the SIP server with sufficient information to select different routing rules, depending on the particular alias host address. Under the above arrangement, a single DAL gateway may be used to serve multiple customers, thereby advantageously reducing telecommunication costs. Another advantage is that no proprietary or specialized protocol needs to be developed, thus permitting rapid deployment.

In one aspect of the present invention, a communication system for providing telephony services over a data network is disclosed. The system includes a gateway that is configured to receive a signal to establish a call with a called station from a calling station in a telephone network associated with one of a plurality of customers. The gateway is configured to generate a message according to a prescribed application layer protocol to establish the call with the called station over the data network. The message includes information identifying the one customer. The system also includes a server that is coupled to the gateway via the data network. The server is configured to receive the message from the gateway and to route the call to the called station based upon the identification information.

In another aspect of the present invention, a method of providing telephony services over a data network is disclosed. The method includes receiving a signal requesting establishment of a call with a called station from a calling station in a telephone network associated with one of a plurality of customers. The method also includes generating a message according to a prescribed application layer protocol to establish the call with the called station over the data network. The message includes information identifying the one customer. The method further includes transmitting the message over the data network to a server that is configured to route the call to the called station based upon the identification information.

In another aspect of the present invention, a network device for supporting telephony services over a data network is disclosed. The device includes a communications interface that is configured to receive a signal requesting establishment of a call with a called station from a calling station in a telephone network associated with one of a plurality of customers. The device also includes a processor that is coupled to the communications interface and is configured to generate a message according to a prescribed application layer protocol to establish the call with the called station over the data network. The message includes information identifying the one customer. The message is transmitted over the data network to a server that is configured to route the call to the called station based upon the identification information.

In another aspect of the present invention, a server apparatus for supporting telephony services over a data network is disclosed. The apparatus includes a communications interface that is coupled to a gateway over the data network and to receive a message from the gateway. The gateway is configured to receive a signal to establish a call with a called station from a calling station in a telephone network associated with one of a plurality of customers, and to generate the message according to a prescribed application layer protocol to establish the call with the called station over the data network. The message includes information identifying the one customer. The apparatus also includes a processor that is coupled to the communications interface and is configured to route the call to the called station based upon the identification information.

In another aspect of the present invention, a network device for supporting telephony services over a data network is disclosed. The device includes means for receiving a signal requesting establishment of a call with a called station from a calling station in a telephone network associated with one of a plurality of customers, and means for generating a message according to a prescribed application layer protocol to establish the call with the called station over the data network. The message includes information identifying the one customer. The message is transmitted over the data network to a server that is configured to route the call to the called station based upon the identification information.

In yet another aspect of the present invention, a computer-readable medium carrying one or more sequences of one or more instructions for supporting telephony services over a data network is disclosed. The one or more sequences of one or more instructions includes instructions which, when executed by one or more processors, cause the one or more processors to perform the step of receiving a signal requesting establishment of a call with a called station from a calling station in a telephone network associated with one of a plurality of customers. Another step includes generating a message according to a prescribed application layer protocol to establish the call with the called station over the data network. The message includes information identifying the one customer. The message is transmitted over the data network to a server configured to route the call to the called station based upon the identification information.

In yet another aspect of the present invention, a computing system for providing telephony services over a data network. The system includes a trunk side interface that is configured to receive a signal to establish a call with a called station from a calling station in a telephone network associated with one of a plurality of customers. The system also includes a signaling interface that is coupled to the trunk side interface and is configured to generate a message according to a prescribed application layer protocol to establish the call with the called station over the data network. The system further includes an identifier selection module that is configured to select an identifier associated with the one customer, wherein the message includes the identifier is forwarded to a server configured to route the call to the called station based upon the identifier.

Still other aspects, features, and advantages of the present invention are readily apparent from the following detailed description, simply by illustrating a number of particular embodiments and implementations, including the best mode contemplated for carrying out the present invention. The present invention is also capable of other and different embodiments, and its several details can be modified in various obvious respects, all without departing from the spirit and scope of the present invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF AN EXEMPLARY EMBODIMENT

In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Although the present invention is discussed with respect to the Session Initiation Protocol (SIP) and an Internet Protocol (IP)-based network, it may be appreciated that one of ordinary skill in the art would recognize that the present invention has applicability to other equivalent communication protocols and data networks, in general. For example, the ITU H.323 protocol suite could be used for signaling instead of, or in conjunction with, SIP-compliant signaling. Other well-known or emerging signaling protocols may also be used. The transport network may take the form of Asynchronous Transfer Mode (ATM) or frame relay without departing from the spirit and scope of the present invention.

Figure 1:
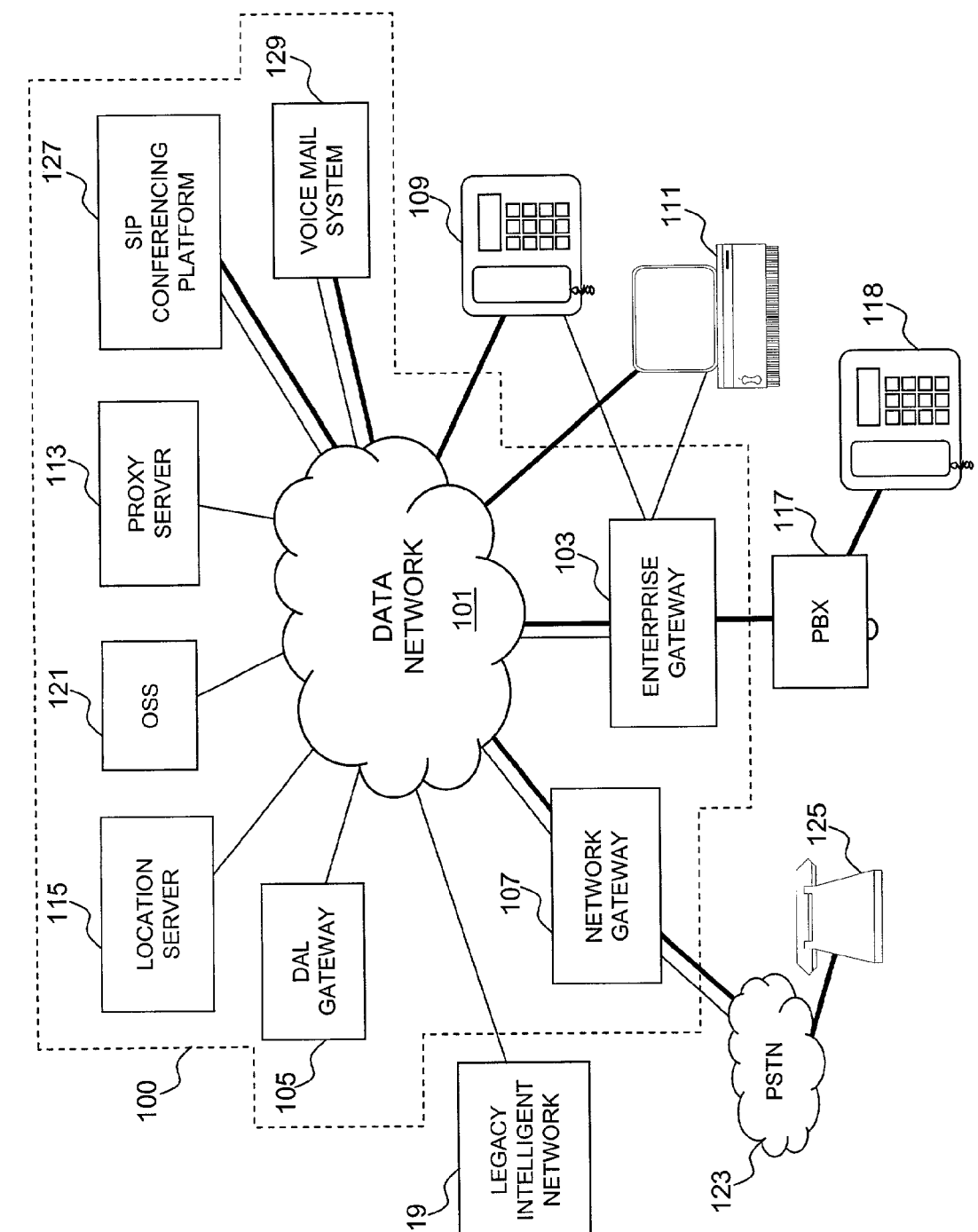
FIG. 1 is a diagram of a data communications system capable of supporting voice services, in accordance with an embodiment of the present invention.

FIG. 1 shows a diagram of a data communications system capable of supporting voice services, in accordance with an exemplary embodiment of the present invention. The communication system 100 includes a data transport network 101, which in an exemplary embodiment is an Internet Protocol (IP) based network. System 100 provides the ability to establish communications among various terminal equipment coupled thereto, such as telephone 125, PBX phone 118 and SIP phone 109. In practice, there may be thousands or millions of such terminal devices served by one or more systems 100. In an exemplary embodiment, the transport network 101 provides a common medium for call control signaling (e.g., SIP, H.323), media traffic (e.g., RTP/RTCP), network management traffic, and provisioning traffic. Thus, all of the elements appear in a hub arrangement around transport network 101.

As used herein, the term "SIP phone" refers to any client (e.g., a personal computer, a web-appliance, etc.) that is configured to provide SIP phone functionalities. The SIP phones 109 may take the form of standalone devices. SIP phone 109 may even be designed and configured to function and appear like a Plain Old Telephone Service (POTS) telephone station. A SIP client 111, however, may be a software client and may run, for example, as an application on a conventional personal computer (PC) or laptop computer. From a signaling perspective, these devices 109, 111 may operate quite similarly, with the main differences relating to the user interface. Unless otherwise stated, it is recognized that the functionalities of both the SIP phones 109 and the SIP client 111 are comparable and that the network operates similarly with either type of device.

System 100 provides a number of elements to support voice services, including an enterprise gateway 103, a Dedicated Access Line (DAL) gateway 105, a network gateway 107, SIP conferencing platform 127, and a voice mail system 129. In particular, system 100 comprises the important elements of a proxy server 113 (also known as a network server (NS)) and a location server (LS) 115. Location server 115 serves as a repository for end user information to enable address validation, feature status, and real-time subscriber feature configuration. Additionally, LS 115 may store configuration information.

For the purposes of explanation, the capabilities of system 100 are described with respect to large enterprise users. It is noted that the feature/functionality of system 100 may be applicable to a variety of user types and communications needs. System 100 is able to support customers that maintain multiple locations with voice and data requirements.

As shown, enterprise gateway 103 provides connectivity from a PBX 117, which contains trunks or lines often for a single business customer or location (e.g., PBX phones 118). Signaling for calls from PBX 117 into the IP network comprises information which uniquely identifies the customer, trunk group, or carrier. This allows private numbers to be interpreted in their correct context. To interface to PBX 117, enterprise gateway 103 may use Integrated Digital Services Network (ISDN), Circuit Associated Signaling (CAS), or other PBX interfaces (e.g., European Telecommunications Standards Institute (ETSI) PRI, R2).

The Dedicated Access Line (DAL) gateway 105 is employed in the system 100 to support private traffic between IP and non-IP locations. The network gateway 107 serves to support single or multiple customers by providing an SS7 (Signaling System 4)/C7-to-SIP Gateway for customers to have the ability to call Off-IP network from an IP-enabled origination point (e.g., enterprise gateway 103 or SIP phone 109). The gateway 107 may support connectivity to a voice switch (not shown), such as a Class 5 switch for domestic call processing and a Class 3 switch for interconnections and international connections. In this example, the gateway 107 communicates with the Public Switched Telephone Network (PSTN) 123, which serves POTS (Plain Old Telephone Service) stations 125. In an exemplary embodiment, the Dedicated Access Line (DAL) gateway 105 is employed in system 100 to allow virtual private network (VPN) customers to be able to access their service even from a conventional telephone not served by the VPN. The network 101 also provides connectivity to a legacy intelligent network 119 (e.g., Advanced Intelligent Network).

Keeping in mind the similar nature of PC soft clients and standalone IP telephones, it maybe said that four possible scenarios exist with the placement of a voice over IP call: (1) phone-to-phone, (2) phone-to-PC, (3) PC-to-phone, and (4) PC-to-PC. In the first scenario of phone-to-phone call establishment, a call from the phone 125 is switched through PSTN 123 by a switch to the network gateway 107, which forwards the call through the IP backbone network 101. The packetized voice call is then routed through network 101, perhaps to another similar network gateway 107, to be at another PSTN phone (not shown). Under the second scenario, the phone 125 places a call to a PC through a switch to the PSTN 123. This voice call is then switched by the PSTN 123 to the SIP network gateway 107, which forwards the voice call to a PC 111 via the network 101. The third scenario involves a PC 111 that places a call to a voice station (e.g., phone 125). Using a voice encoder, the PC 111 introduces a stream of voice packets into the network 101 that are destined for the SIP network gateway 107. The SIP network gateway 107 converts the packetized voice information into a POTS electrical signal, which is circuit switched to the voice station (e.g., phone 125). Lastly, in the fourth scenario, a PC 111 establishes a voice call with another PC (not shown); in this case, packetized voice data is transmitted from the PC 111 via the network 101 to the other PC (not shown), where the packetized voice data is decoded.

As mentioned, system 100 may employ SIP to exchange session setup messages. Another popular session establishment protocol is referred to as the H.323 protocol, although it is actually a set of related protocols promulgated by the International Telecommunication Union (ITU) for accomplishing multimedia communication. SIP is an alternative standard that has been developed by the Internet Engineering Task Force (IETF). SIP is a signaling protocol that is based on a client-server model, generally meaning that clients invoke required services by messaging requests to servers that can provide the services. Similar to other IETF protocols (e.g., the simple mail transfer protocol (SMTP) and Hypertext Transfer Protocol (HTTP)), SIP is a textual, humanly readable protocol.

It may be noted that neither the H.323 or SIP protocols are limited to IP telephony applications, but have applicability to establishing communications sessions (such as video conferencing) in general. In one embodiment of the present invention, SIP is used to establish telephone calls and other types of sessions through system 100. However, it will be apparent to those of ordinary skill in the art that the H.323 protocol (with some modifications or extensions) or other similar protocols could be utilized instead of SIP. Separate from SIP, but often used in conjunction with SIP, is the Session Description Protocol (SDP), which provides information about media streams in the multimedia sessions to permit the recipients of the session description to participate in the session.

The Internet Engineering Task Force's SIP protocol defines numerous types of requests, which are also referred to as methods. An important method is the INVITE method, which invites a user to a conference. Another method is the BYE request, which indicates that the call may be released. In other words, BYE terminates a connection between two users or parties in a conference. Another method is the OPTIONS method. This method solicits information about capabilities without necessarily establishing a call. The REGISTER method may used to provide information to a SIP server about a user's present location.

Details regarding SIP and its call control services are described in IETF RFC 2543 and IETF Internet Draft "SIP Call Control Services", Jun. 17, 1999; both of these documents are incorporated herein by reference in their entireties.

Transmission of SIP messages can take place in an IP network through the well-known User Datagram Protocol (UDP) or through the more reliable Transmission Control Protocol (TCP). Whereas SIP, H.323, or other protocols may be used to establish sessions through a data network, the actual media or "traffic" that is to be communicated among users may take place according to the well known Real-time Transport Protocol(RTP) as described in the IETF document RFC 1889.

In the traditional telephone network, calls are directed to specific locations or terminal devices uniquely identified by the called telephone number. In contrast, system 100 enables the caller to specify a called party to be reached independent of any particular location or terminal.

The user may move from one terminal to another and, at each terminal, may register as being present so that inbound calls are directed to the most recently registered location. Furthermore, a user may have both personal and group-wise profile settings that affect the activation of features, such as call blocking, even as a function of the time of day.

Network Server 113, also referred to as a "proxy server", generally acts on behalf of a user to coordinate the establishment of a desired session. Because of the dynamic nature of user location and of call handling features, each request to establish a session is first routed to a proxy server so that user permissions may be verified, destination addresses may be found, and special features related to a user or a business may be applied to the call. Requests are serviced within the proxy server or by sending further requests to other servers.

In a complementary capacity to the proxy server, a location server 115 generally acts as a source of information on how to establish contact with a given destination party. Typically, location server 115 accepts a routing request, such as from a proxy server, and determines addresses or "contacts" corresponding to the destination party expressed in the routing request. In response to the request, the location server may return a redirect response comprising contact information for the party. It is noted that messaging between NS 113 and LS 115 may use a modified version of SIP. For example, SIP acknowledgement messages may be unnecessary between NS 113 and LS 115. Otherwise, messaging among network functions, such as NS 113 and LS 115, may use standard SIP or even non-SIP alternatives.

System 100 further includes an Operational Support Systems (OSS) 121 to provide provisioning, billing, and network management capabilities. The service provisioning aspect of OSS 121 affects the overall behavior of system 100 in providing services. OSS 121 may provide an environment or an interface, such as a web-based interface, for provisioning many aspects of dialing plans, user permissions and how features operate on behalf of each user. Many of these aspects are configured via OSS 121 by changing information within location servers or databases within system 100. Some specific features that may be configured by OSS 121 include legacy Centrex features such as Unconditional Call Forwarding, Conditional Call Forwarding, Call Blocking and Call Screening.

As regards network management, the system 100 supports, for example, Simple Network Management Protocol (SNMP) v2. The system 100 defines minimum traps for support: Link Up/Down on all IP Network interfaces (Ethernet) for the systems, and Login/Bad login (all logins and bad logins) is set in Management Information Base (MIB) definition for administrators and subscribers.

SIP phones 109 allow users to register and de-register, or login and logout, from the phone. In an exemplary embodiment, to provide mobility, SIP phones 109 permit usernames and passwords to be entered for visitors. Logging in allows the SIP phone to assume the profile of the visitor. By logging in, incoming calls to the visitor's profile are directed to the phone. When a visitor logs in, SIP phones 109 register the visitor with the Network Server 113 and Location Server 115. Any incoming call to any of the profiles registered by the phone can be directed to the phone. Network Server 113 and Location Server 115 may respond similarly to both situations where a user is logged in as a visitor or where the user is logged in to their usual home device, if there is one. The Network Server 113 and Location Server 115 logic may use the user name and password obtained through an authentication challenge to ensure that the registration is allowed.

With respect to E.164 and DNS addressing, SIP phones 109 may support ENUM (Electronic Number) service, which is be used to route calls that originate in the IP domain or with ENUM-enabled networks. ENUM service is detailed in IETF RFC 2916, entitled "ENUM", which is incorporated herein by reference in its entirety. The SIP phones 109 may also support client-based directory lookup.

As evident from the above discussion, the system 100 has several advantages over other approaches, such as IP PBX solutions, including scalability, network-based equipment and support. The system 100 offers advantages to customers who seeks to retain their existing network equipment, and therefore, lower their cost of entry into IP based voice services.

The system 100 advantageously provides simplified telecommunications pricing, ordering, and maintenance as well as eliminates the need for the customers to own and manage their own phone system functionality. Further, the system 100 reduces telecom staffing/costs. The services that are provided by the system 100 are not industry specific and may appeal to customers with multiple, disperse locations, those with international locations, and those with a heavy investment in packet networks.

While conventional approaches provide applications via third parties, the present invention provides a network that is based and designed to interoperate with each other. Importantly, it is the standards based, non-proprietary approach taken by the system 100 that provides service differentiation from the perspective of the customer. This approach provides longevity and extensibility to the customer. However, some customers may prefer to own the equipment and have more control over its uses, regardless of its long-term viability. Therefore, the present invention effectively addresses this scenario as well by providing a seamless interface with the customer premise equipment (CPE).

Figure 2:
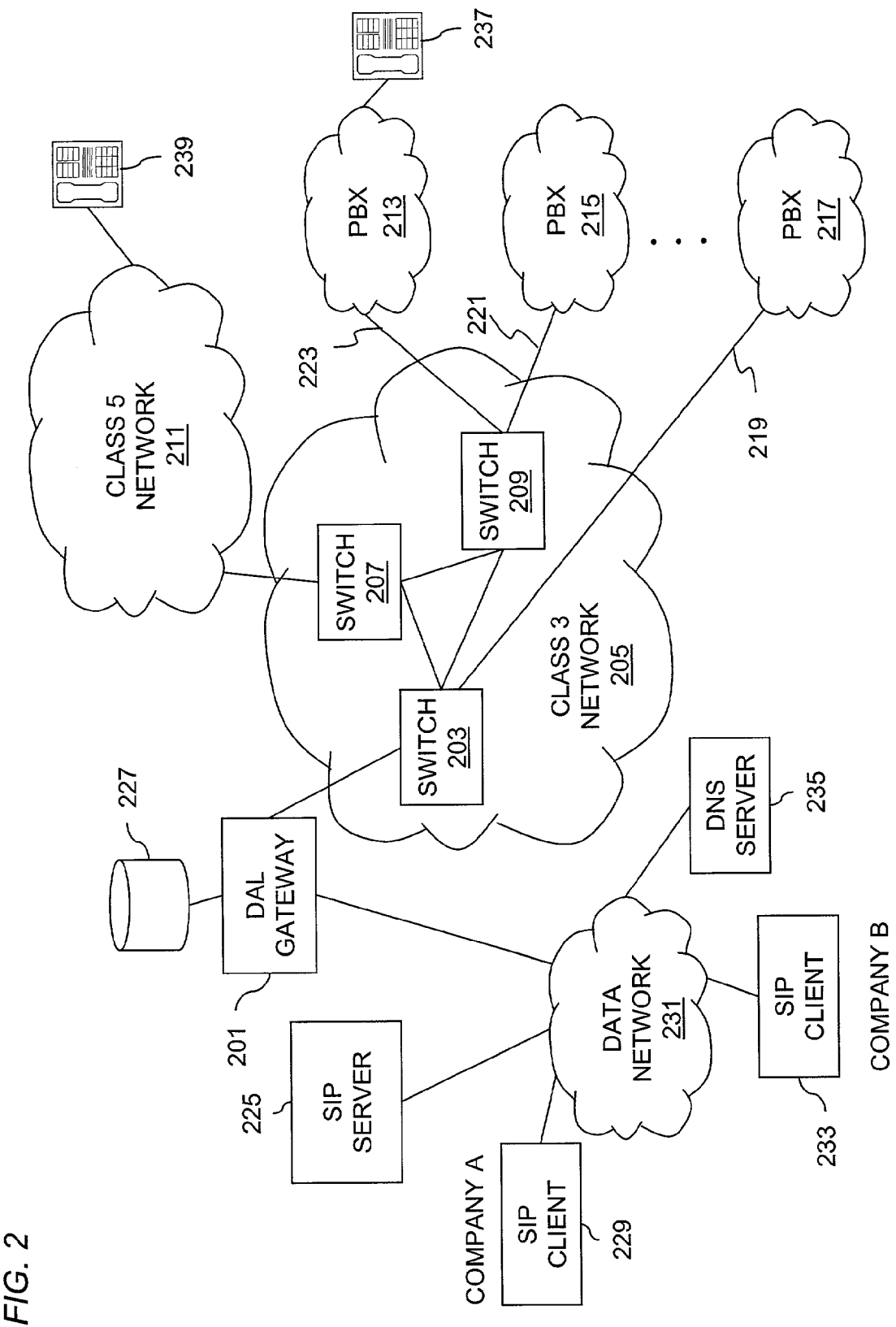
FIG. 2 is a diagram of a Dedicated Access Line (DAL) gateway that is shared among multiple customers, according to an embodiment of the present invention.

FIG. 2 is a diagram of a DAL gateway that is shared among multiple customers, according to an embodiment of the present invention. Under this arrangement, a shared DAL gateway 201 interfaces a switch 203, which in an exemplary embodiment, is a Class 3 switch that resides within a Class 3 network 205, over one or more trunks associated with one or more customers (e.g., Company A and Company B).

Class 3 network 205 supports two types of routing. The first type of is based on explicitly specifying the destination switch ID (identification) and trunk-group. The second type of routing is based upon the number as dialed by an originator, followed by a table look-up or other logic to resolve the dialed number to a switch/trunk destination.

Class 3 network 205 may include multiple Class 3 switches 207, 209, which respectively connect to a Class 5 network 211 and one or more customers' private telephone networks (i.e., PBXs) 213, 215. As shown, the switch 203 serves PBX 217 over a dedicated access line (DAL) 219. Similarly, the switches 207, 209 are correspondingly connected to the PBXs 213, 215 over dedicated access lines 221, 223.

In a novel fashion, DAL gateway 201 utilizes alias host addressing, as more fully described below, to support multiple customers, thereby permitting gateway 201 to be shared among the customers (i.e., Company A and Company B). A SIP server 225, which is attached to a data network 231 (e.g., an IP-based network), may comprise a proxy server and/or a location server.

In accordance with a preferred exemplary embodiment, SIP server 225 is configured to discriminate between different incoming messages from the shared DAL gateway 201. Based upon indicators in these messages, SIP server 225 selects the proper routing rules. As depicted in FIG. 2, SIP server 225 performs call routing for both Company A and Company B. In the case that multiple trunks exist between the DAL gateway 201 and the Class 3 network 205 (in particular, the switch 203), the messages transmitted by the DAL gateway 201 would indicate the specific trunk that the call from, as the trunks are generally associated with different customers (e.g., Company A and Company B). The DAL gateway 201, in an exemplary embodiment, authenticates users based on identification information stored in a database 227 (i.e., authentication database). Further, discrimination is required when calls are carried over the same trunk; for example, in the case of dial-in toll-free (i.e., 800) numbers, each of the customers, Company A and Company B, would have different numbers, but would require the use of the same DAL gateway 201. Thus, discrimination may be achieved by examining the dialed number as might be provided by Dialed Number Identification provided in the signaling from switch 203. As a result, the discrimination information, based on the dialed number or switch-ID/trunk-group, is conveyed in the form of alias host addresses, as next described.

Requested addresses in SIP messages are of the form "x@y," where "x" is referred to as the user portion, and "y" is the host portion. The host portion, through a Domain Name Service (DNS) server 235 resolves to an IP address, in this case, of the SIP server 225. The shared DAL gateway 201 uses alias host addresses for the same SIP server (i.e., server 225), and thereby is able to convey additional discrimination information via the host address. The process for call establishment between a telephone station 237 off of the PBX 213 and the SIP client 229 of Company A is shown in FIG. 3.

Accordingly, in the situation whereby multiple trunks are utilized between the DAL gateway 201 and the switch 203, the DAL gateway 201 utilizes an alias host address that corresponds to a particular switch-ID/trunk-group. In the case of the toll-free call processing, such a call would normally originate from the Class 5 network 211 from a telephone station 239, for example. Based on the toll-free number that was dialed to reach the gateway, the DAL gateway 201 determines the proper host alias to assign.

Figure 3:
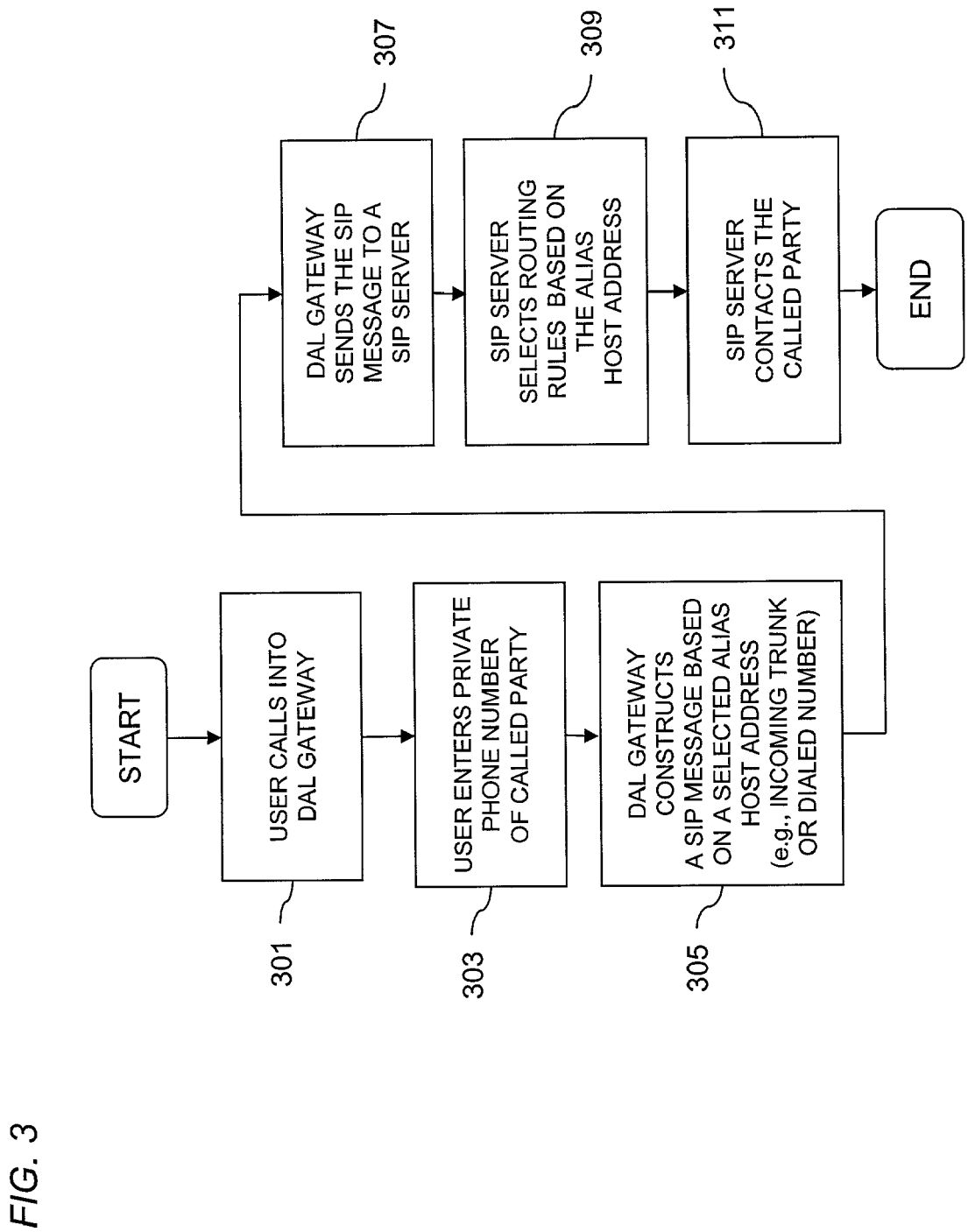
FIG. 3 is a flowchart of a process for sharing the DAL gateway among multiple customers in the system of FIG. 2.

FIG. 3 is a flowchart of a process for sharing the DAL gateway among multiple customers in the system of FIG. 2. Continuing with the example of FIG. 2, assuming two phone numbers are used to reach the gateway 201: 18005550001, and 18005550002, in which the call is destined for one of the SIP clients 229, 233. The SIP clients 229, 233 are associated with two different companies, Company A and Company B. By way of example, a calling party using a telephone station 239 dials one of these two numbers, per step 301. The call is carried over the trunk 223 and forwarded to the switch 203, which routes the call to the DAL gateway 201. The gateway 201 then collects subsequent digits from the calling station 237, in which the calling party enters a private phone number (e.g., "1234") corresponding to the SIP client 229 of Company A, per step 303. It is noted that the SIP client 233 of Company B may also have a private phone number of "1234."

The gateway 201 next, as in step 305, generates a SIP message with one of two different alias host addresses and forwards, as in step 307, the SIP message to the SIP server 225. Each of the alias host addresses may be based on either the switch-ID/trunk group or the dialed number. In this example, the first alias host address is 1234@a18005550001.xyz.com, and the second alias host address is 1234@a18005550002.xyz.com.

The DNS server 235 in the data network 231 is configured such that the host addresses "a18005550001.xyz.com and "a18005550002.xyz.com" both return the IP address of the SIP server 225 (e.g., an address of "5.6.7.8"). Accordingly, both of these addresses result in the messages being routed to the same SIP server. The advantage is that, by detecting these two different alias host addresses, the SIP server 225 can select to use one set of routing rules with respect to the first alias host address, and a different set of routing rules for the second alias host address (per step 309). In step 311, the SIP server 225 completes the call to the SIP client 229.

The above approach advantageously enables a single gateway to be shared among multiple clients, thereby increasing network efficiency as well as reduce costs. Further, scaling can be performed cost-effectively through sharing gateway resources.

Figure 4:
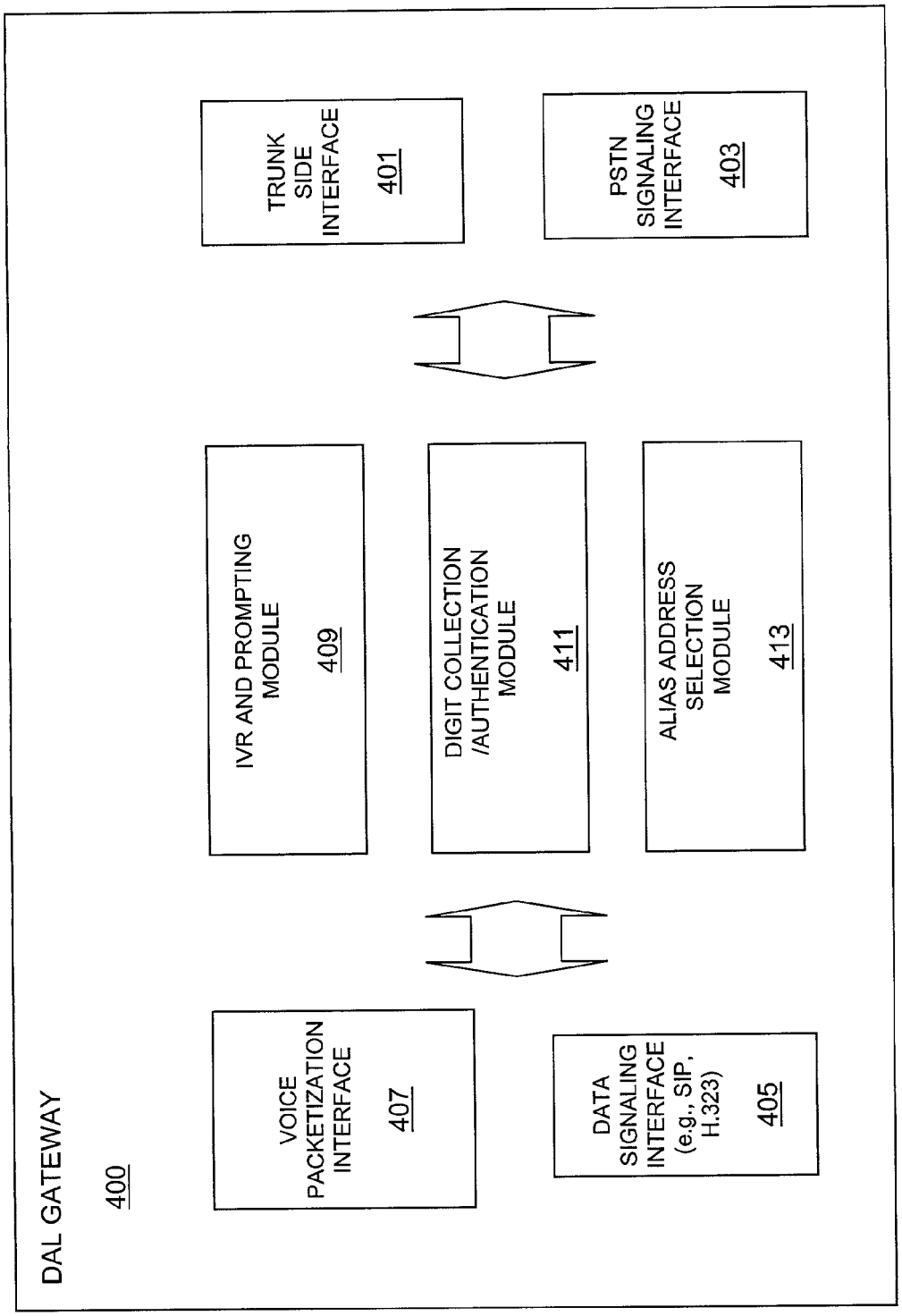
FIG. 4 is a diagram of a DAL gateway utilized in the system of FIG. 2.

FIG. 4 is a diagram of a DAL gateway utilized in the system of FIG. 2. A DAL gateway 400, according to an embodiment of the present invention, includes a Trunk Side Interface 401 for access to bearer circuits of a telephony network, such as the Class 3 network 205 of FIG. 2. The Trunk Side Interface 401 may support, for example, standard T1 or E1 rates as well as ISDN (Integrated Services Digital Network) PRI (Primary Rate Interface). A PSTN Signaling Interface 403 is also included in the DAL gateway to support, for example, Signaling System 7 (SS7).

On the data network side, the DAL gateway 400 provides a Data Signaling Interface 405 to a data network. The Data Signaling Interface 405, in an exemplary embodiment, supports SIP; alternatively, the interface 405 may support the International Telecommunications Union (ITU) H.323 standard or other similar protocols or standards.

As shown, DAL gateway 400 includes a Voice Packetization Interface 407 for packetizing voice signals for transport over the data network. Specifically, the Voice Packetization Interface 407 converts the voice signals, which may be pulse code modulation (PCM) signals, from the Trunk Side Interface 401 into packets that are formatted for transmission over the data network 231 (FIG. 2).

The gateway 400 also has an optional Interactive Voice Response (IVR) and Prompting Module 409, and a Digit Collection and Authentication Module 409. It is noted that the module 409 may be implemented as two separate modules: one dedicated to digit collection functions, and one for authentication functions. The Interactive Voice Response (IVR) and Prompting Module 409 permits prompting of the caller to announce various messages and to provide prompting for entries from a user. It is recognized that full IVR functionality is often not required; for instance, a prompting tone may be used to indicate to the user that the gateway 400 is waiting to collect digits (e.g., destination number, password, personal identification number (PIN), etc.). Thus, the gateway 400 may provide sophisticated prompts to instruct the user or simply generate one or more tones as prompts. From a security perspective, the less sophisticated the prompts, the more secure the system, in terms of potential for abuse and fraud in that the authorized users would normally be aware of the procedures for call establishment (e.g., to listen for a tone).

The Digit Collection and Authentication Module 411 serves to identify and authenticate the user. The collected digits are needed to authenticate the user and to identify the destination directory number.

Further, the DAL gateway 400 includes an Alias Address Selection Module 413 which selects the appropriate alias host address for inclusion in a SIP message, as described above in the process of FIG. 3. The Module 413, in an exemplary embodiment, may select the alias host addresses according one of two criteria: switch-ID/trunk group, and dialed number. According to one embodiment of the present invention, the DAL gateway 400 may be an AS5300/Voice Gateway, which is manufactured by CISCO SYSTEMS, Inc.

Figure 5:
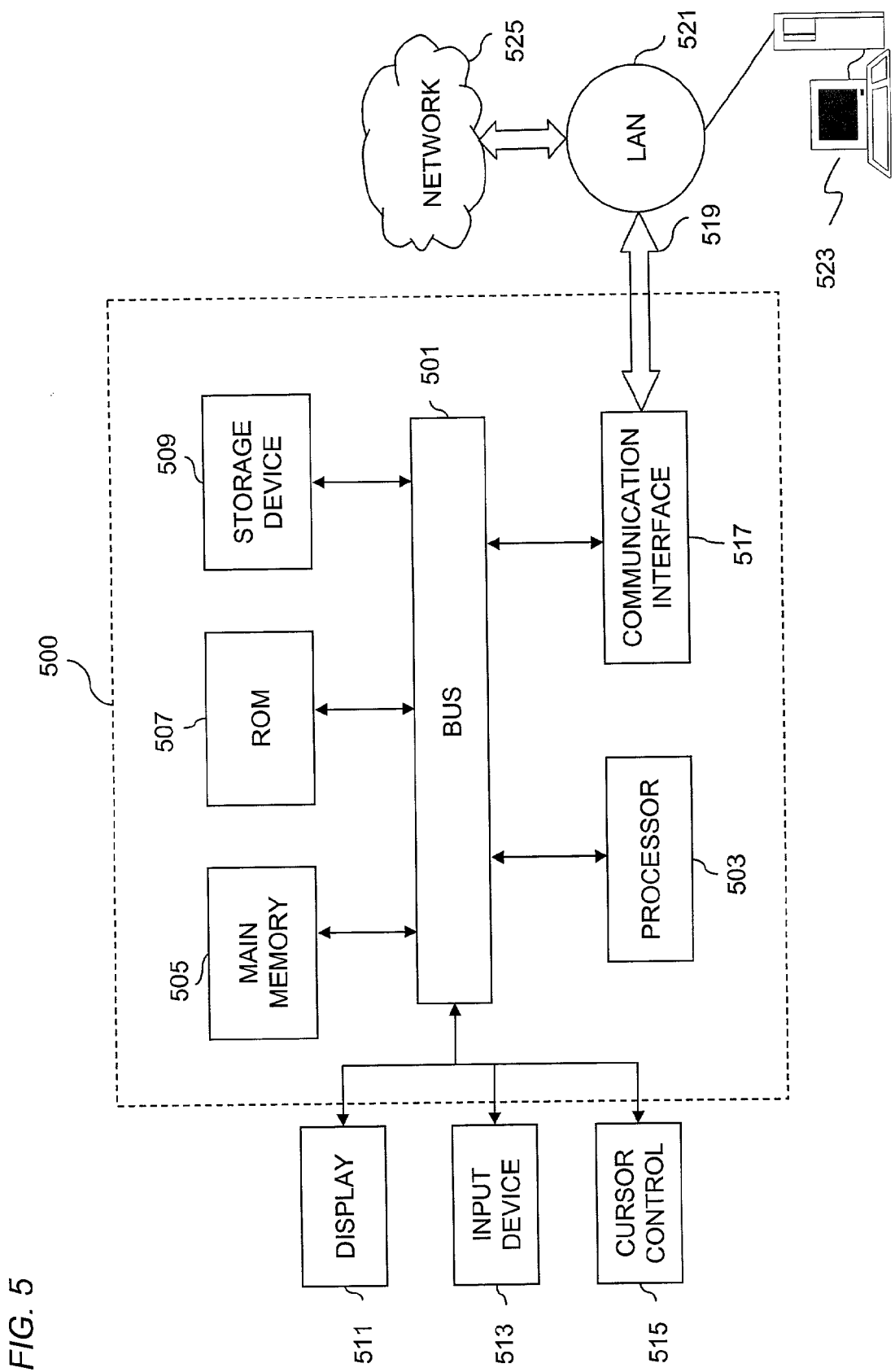
FIG. 5 is a diagram of a computer system that can be used to implement an embodiment of the present invention.
Figure 6:
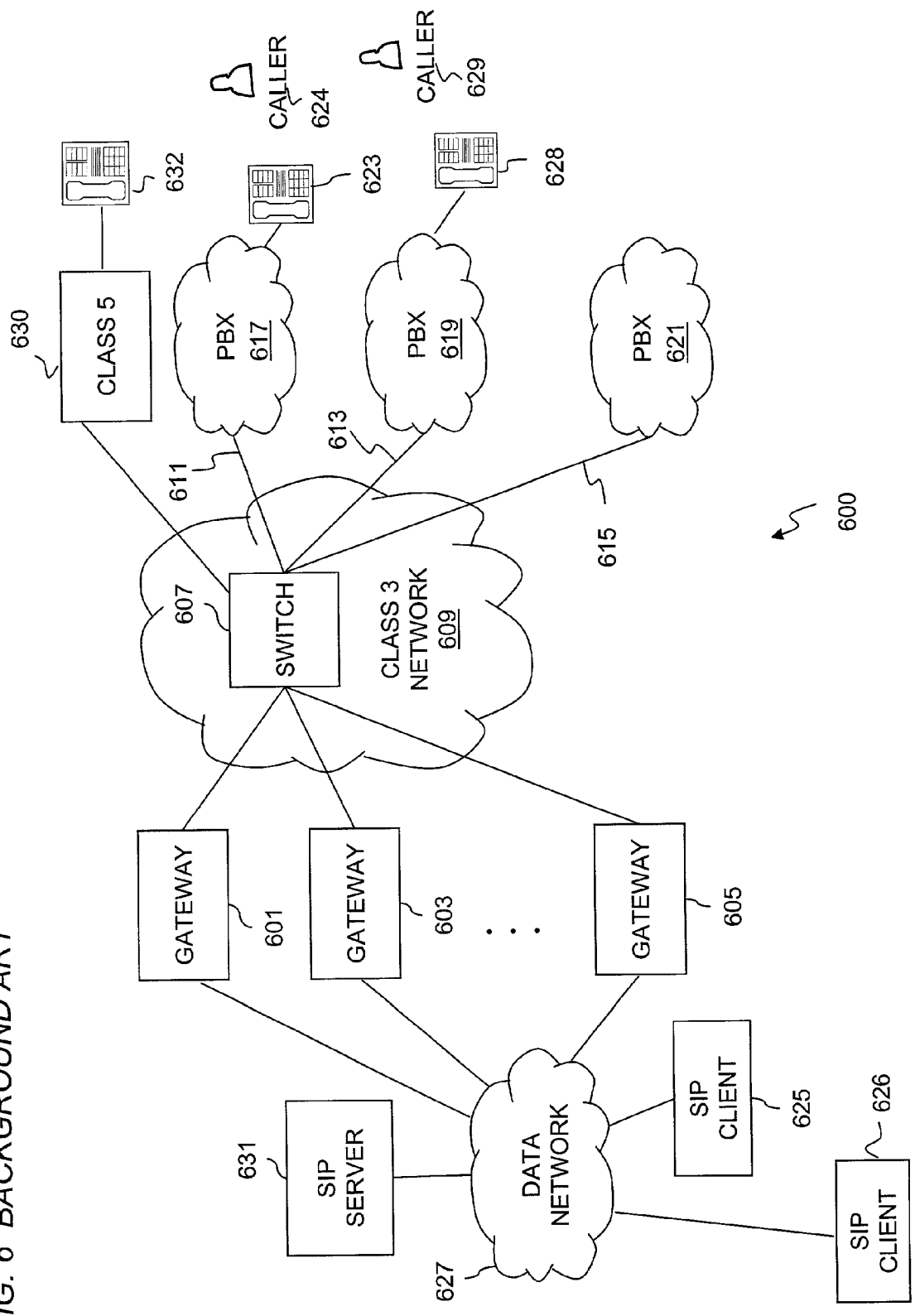
FIG. 6 is a diagram of a conventional approach that employs multiple gateways to service multiple customers.

FIG. 5 illustrates a computer system 500 upon which an embodiment according to the present invention can be implemented. The computer system 500 includes a bus 501 or other communication mechanism for communicating information, and a processor 503 coupled to the bus 501 for processing information. The computer system 500 also includes main memory 505, such as a random access memory (RAM) or other dynamic storage device, coupled to the bus 501 for storing information and instructions to be executed by the processor 503. Main memory 505 can also be used for storing temporary variables or other intermediate information during execution of instructions to be executed by the processor 503. The computer system 500 further includes a read only memory (ROM) 507 or other static storage device coupled to the bus 501 for storing static information and instructions for the processor 503. A storage device 509, such as a magnetic disk or optical disk, is additionally coupled to the bus 501 for storing information and instructions.

The computer system 500 may be coupled via the bus 501 to a display 511, such as a cathode ray tube (CRT), liquid crystal display, active matrix display, or plasma display, for displaying information to a computer user. An input device 513, such as a keyboard including alphanumeric and other keys, is coupled to the bus 501 for communicating information and command selections to the processor 503. Another type of user input device is cursor control 515, such as a mouse, a trackball, or cursor direction keys for communicating direction information and command selections to the processor 503 and for controlling cursor movement on the display 511.

According to one embodiment of the invention, the DAL gateway functionalities (such as the process of FIG. 3) are provided by the computer system 500 in response to the processor 503 executing an arrangement of instructions contained in main memory 505. Such instructions can be read into main memory 505 from another computer-readable medium, such as the storage device 509. Execution of the arrangement of instructions contained in main memory 505 causes the processor 503 to perform the process steps described herein. One or more processors in a multi-processing arrangement may also be employed to execute the instructions contained in main memory 505. In alternative embodiments, hard-wired circuitry may be used in place of or in combination with software instructions to implement the embodiment of the present invention. Thus, embodiments of the present invention are not limited to any specific combination of hardware circuitry and software.

The computer system 500 also includes a communication interface 517 coupled to bus 501. The communication interface 517 provides a two-way data communication coupling to a network link 519 connected to a local network 521. For example, the communication interface 517 may be a digital subscriber line (DSL) card or modem, an integrated services digital network (ISDN) card, a cable modem, or a telephone modem to provide a data communication connection to a corresponding type of telephone line. As another example, communication interface 517 may be a local area network (LAN) card (e.g. for Ethernet™ or an Asynchronous Transfer Model (ATM) network) to provide a data communication connection to a compatible LAN. Wireless links can also be implemented. In any such implementation, communication interface 517 sends and receives electrical, electromagnetic, or optical signals that carry digital data streams representing various types of information. Further, the communication interface 517 can include peripheral interface devices, such as a Universal Serial Bus (USB) interface, a PCMCIA (Personal Computer Memory Card International Association) interface, etc. Although only a single communication interface 517 is shown, it is recognized that multiple communication interfaces may be employed to communicate with different networks and devices.

The network link 519 typically provides data communication through one or more networks to other data devices. For example, the network link 519 may provide a connection S, through local network 521 to a host computer 523, which has connectivity to a network 525 (e.g. a wide area network (WAN) or the global packet data communication network now commonly referred to as the "Internet 127") or to data equipment operated by service provider. The local network 521 and network 525 both use electrical, electromagnetic, or optical signals to convey information and instructions. The signals through the various networks and the signals on network link 519 and through communication interface 517, which communicate digital data with computer system 500, are exemplary forms of carrier waves bearing the information and instructions.

The computer system 500 can send messages and receive data, including program code, through the networks, network link 519, and communication interface 517. In the Internet 127 example, a server (not shown) might transmit requested code belonging an application program for implementing an embodiment of the present invention through the network 525, local network 521 and communication interface 517. The processor 504 may execute the transmitted code while being received and/or store the code in storage device 59, or other non-volatile storage for later execution. In this manner, computer system 500 may obtain application code in the form of a carrier wave.

The term "computer-readable medium" as used herein refers to any medium that participates in providing instructions to the processor 504 for execution. Such a medium may take many forms, including but not limited to non-volatile media, volatile media, and transmission media. Non-volatile media include, for example, optical or magnetic disks, such as storage device 509. Volatile media include dynamic memory, such as main memory 505. Transmission media include coaxial cables, copper wire and fiber optics, including the wires that comprise bus 501. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the present invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistance (PDA) and a laptop. An infrared detector on the portable computing device receives the information and instructions borne by the infrared signal and places the data on a bus. The bus conveys the data to main memory, from which a processor retrieves and executes the instructions. The instructions received by main memory may optionally be stored on storage device either before or after execution by processor.

Accordingly, the present invention provides an integrated communication system supporting telephony and data services over a data network. In particular, the system employs a dedicated access line (DAL) gateway that interfaces with one or more private telephone networks (e.g., Class 3 networks). A single DAL gateway is shared among multiple customers, such that a user (i.e., calling party) can call into the gateway and, through two-stage dialing, enter a private phone number of another user (i.e., called party). The DAL gateway generates a Session Initiation Protocol (SIP) message to a SIP server, directing the SIP server to direct the call to a SIP client associated with the called party. The DAL gateway utilizes, in an exemplary embodiment, alias host addresses to identify the respective customers. These alias host addresses are stored in a Domain Name Service (DNS) server to map to a common host address—that of the SIP server. The use of alias host addresses provides the SIP server with sufficient information to select different routing rules, depending on the particular alias host address. Under the above arrangement, a single DAL gateway may be used to serve multiple customers, thereby advantageously reducing telecommunication costs. Another advantage is that no proprietary or specialized protocol need to be developed, thus permitting rapid deployment.

While the present invention has been described in connection with a number of embodiments and implementations, the present invention is not so limited but covers various obvious modifications and equivalent arrangements, which fall within the purview of the appended claims.

What is claimed is:

1. A communication system for providing telephony services over a data network, the system comprising:
   a dedicated access line (DAL) gateway shared among a plurality of organizational customers and configured to receive a signal to establish a call with a called station from a calling station in a telephone network associated with one of the organizational customers, and to generate a message according to a prescribed application layer protocol to establish the call with the called station over the data network, wherein the message includes information identifying the one organizational customer; and
   a server coupled to the gateway via the data network, the server being configured to receive the message from the gateway and to route the call to the called station based upon the identification information.

2. A system according to claim 1, wherein the application layer protocol includes at least one of a Session Initiation Protocol and H.323 protocol.

3. A system according to claim 1, wherein the identification information is an alias host address.

4. A system according to claim 3, further comprising:
   a name server coupled to the gateway and configured to map the alias host address to a host address associated with the server.

5. A system according to claim 4, wherein the name server stores a plurality of alias host addresses corresponding to the organizational customers, each of the plurality of alias host addresses mapping to the host address of the server.

6. A system according to claim 1, wherein the telephone network interfaces with a Class 3 switch that couples to the gateway via a plurality of trunks having corresponding switch identification/trunk-group information, the identification information being based on the switch identification/trunk-group information.

7. A system according to claim 1, wherein the identification information includes a host field to identify the server, and a user field to specify the one organizational customer associated with the calling station.

8. A system according to claim 1, wherein the gateway is further configured to collect digits from the calling station, the identification information being based on the collected digits.

9. A system according to claim 1, wherein:
   the gateway is further configured to receive another signal to establish another call with another called station from another calling station in another telephone network associated with another one of the enterprise customers, the gateway being configured to generate another message according to the prescribed application layer protocol to establish the other call with the other called station over the data network, wherein the other message includes other information identifying the one enterprise customer; and
   the server is further configured to receive the another message from the gateway and to route the other call to the other called station based upon the identification information.

10. A method of providing telephony services over a data network, the method comprising:
    receiving a signal, from a dedicated access line (DAL) gateway shared among a plurality of organizational customers, requesting establishment of a call with a called station from a calling station in a telephone network associated with one of the organizational customers;
    generating a message according to a prescribed application layer protocol to establish the call with the called station over the data network, wherein the message includes information identifying the one organizational customer; and
    transmitting the message over the data network to a server configured to route the call to the called station based upon the identification information.

11. A method according to claim 10, wherein the application layer protocol in the generating step includes at least one of a Session Initiation Protocol and H.323 protocol.

12. A method according to claim 10, wherein the identification information in the generating step is an alias host address.

13. A method according to claim 12, further comprising:
    communicating with a name server that translates the alias host address to a host address associated with the server.

14. A method according to claim 13, wherein the name server in the communicating step stores a plurality of alias host addresses corresponding to the organizational customers, each of the plurality of alias host addresses mapping to the host address of the server.

15. A method according to claim 10, wherein the telephone network in the receiving step interfaces with a Class 3 switch via a plurality of trunks having corresponding switch identification/trunk-group information, the identification information being based on the switch identification/trunk-group information.

16. A method according to claim 10, wherein the identification information includes a host field to identify the server, and a user field to specify the one organizational customer associated with the calling station.

17. A method according to claim 10, further comprising:
    collecting digits from the calling station, wherein the message contains the collected digits, the identification information being based on the collected digits.

18. A network device for supporting telephony services over a data network, the device comprising:
    a communications interface receiving a signal, from a dedicated access line (DAL) gateway shared among a plurality of organizational customers, requesting establishment of a call with a called station from a calling station in a telephone network associated with one of a plurality of organizational customers; and
    a processor coupled to the communications interface generating a message according to a prescribed application layer protocol to establish the call with the called station over the data network, wherein the message includes information identifying the one organizational customer, the message being transmitted over the data network to a server to route the call to the called station based upon the identification information.

19. A device according to claim 18, wherein the application layer protocol includes at least one of a Session Initiation Protocol and H.323 protocol.

20. A device according to claim 18, wherein the identification information is an alias host address.

21. A device according to claim 20, wherein the communications interface communicates with a name server that is configured to map the alias host address to a host address associated with the server.

22. A device according to claim 20, wherein the name server stores a plurality of alias host addresses corresponding to the organizational customers, each of the plurality of alias host addresses mapping to the host address of the server.

23. A device according to claim 18, wherein the telephone network interfaces with a Class 3 switch that couples to the gateway via a plurality of trunks having corresponding switch identification/trunk-group information, the identification information being based on the switch identification/trunk-group information.

24. A device according to claim 18, wherein the identification information includes a host field to identify the server, and a user field to specify the one organizational customer associated with the calling station.

25. A device according to claim 18, wherein the processor is further configured to collect digits from the calling station, the identification information being based on the collected digits.

26. A server apparatus for supporting telephony services over a data network, the apparatus comprising:
   a communications interface coupled to a dedicated access line (DAL) gateway shared among a plurality of organizational customers over the data network and to receive a message from the gateway, the gateway being configured to receive a signal to establish a call with a called station from a calling station in a telephone network associated with one of the organizational customers, and to generate the message according to a prescribed application layer protocol to establish the call with the called station over the data network, wherein the message includes information identifying the one organizational customer; and
   a processor coupled to the communications interface and configured to route the call to the called station based upon the identification information.

27. An apparatus according to claim 26, wherein the application layer protocol includes at least one of a Session Initiation Protocol and H.323 protocol.

28. An apparatus according to claim 26, wherein the identification information is an alias host address.

29. An apparatus according to claim 28, further comprising:
   a name server coupled to the gateway and configured to map the alias host address to a host address associated with the apparatus.

30. An apparatus according to claim 28, wherein the name server stores a plurality of alias host addresses corresponding to the organizational customers, each of the plurality of alias host addresses mapping to the host address of the apparatus.

31. An apparatus according to claim 26, wherein the telephone network interfaces with a Class 3 switch that couples to the gateway via a plurality of trunks having corresponding switch identification/trunk-group information, the identification information being based on the switch identification/trunk-group information.

32. An apparatus according to claim 26, wherein the identification information includes a host field to identify the apparatus, and a user field to specify the one organizational customer associated with the calling station.

33. An apparatus according to claim 26, wherein the gateway is further configured to collect digits from the calling station, the identification information being based on the collected digits.

34. A network device for supporting telephony services over a data network, the device comprising:
   means for receiving a signal, from a dedicated access line (DAL) gateway shared among a plurality of enterprise customers, requesting establishment of a call with a called station from a calling station in a telephone network associated with one of the enterprise customers; and
   means for generating a message according to a prescribed application layer protocol to establish the call with the called station over the data network, wherein the message includes information identifying the one enterprise customer, the message being transmitted over the data network to a server configured to route the call to the called station based upon the identification information.

35. A device according to claim 34, wherein the application layer protocol includes at least one of a Session Initiation Protocol and H.323 protocol.

36. A device according to claim 34, wherein the identification information is an alias host address.

37. A device according to claim 36, further comprising:
   means for communicating with a name server that translates the alias host address to a host address associated with the server.

38. A device according to claim 37, wherein the name server stores a plurality of alias host addresses corresponding to the enterprise customers, each of the plurality of alias host addresses mapping to the host address of the server.

39. A device according to claim 34, wherein the telephone network interfaces with a Class 3 switch via a plurality of trunks having corresponding switch identification/trunk-group information, the identification information being based on the switch identification/trunk-group information.

40. A device according to claim 34, wherein the identification information includes a host field to identify the server, and a user field to specify the one enterprise customer associated with the calling station.

41. A device according to claim 34, further comprising:
   means for collecting digits from the calling station, wherein the identification information is based on the collected digits.

42. A computer-readable non-volatile or volatile storage medium carrying one or more sequences of one or more instructions for supporting telephony services over a data network, the one or more sequences of one or more instructions including instructions which, when executed by one or more processors, cause the one or more processors to perform the steps of:
   receiving a signal, from a dedicated access line (DAL) gateway shared among a plurality of enterprise customers, requesting establishment of a call with a called station from a calling station in a telephone network associated with one of a the enterprise customers; and
   generating a message according to a prescribed application layer protocol to establish the call with the called station over the data network, wherein the message includes information identifying the one enterprise customer, wherein the message is transmitted over the data network to a server configured to route the call to the called station based upon the identification information.

43. A computer-readable non-volatile or volatile storage medium according to claim 42, wherein the application layer protocol in the generating step includes at least one of a Session Initiation Protocol and H.323 protocol.

44. A computer-readable non-volatile or volatile storage medium according to claim 42, wherein the identification information in the generating step is an alias host address.

45. A computer-readable non-volatile or volatile storage medium according to claim 42, wherein the one or more processors further perform the step of communicating with a name server that translates the alias host address to a host address associated with the server.

46. A computer-readable non-volatile or volatile storage medium according to claim 45, wherein the name server in the communicating step stores a plurality of alias host addresses corresponding to the enterprise customers, each of the plurality of alias host addresses mapping to the host address of the server.

47. A computer-readable non-volatile or volatile storage medium according to claim 42, wherein the telephone network in the receiving step interfaces with a Class 3 switch via a plurality of trunks having corresponding switch identification/trunk-group information, the identification information being based on the switch identification/trunk-group information.

48. A computer-readable non-volatile or volatile storage medium according to claim 42, wherein the identification information in the generating step includes a host field to identify the server, and a user field to specify the one enterprise customer associated with the calling station.

49. A computer-readable non-volatile or volatile storage medium according to claim 42, wherein the one or more processors further perform the step of collecting digits from the calling station, wherein the identification information is based on the collected digits.

50. A computing system for providing telephony services over a data network, the system comprising:

a trunk side interface configured to receive a signal from a dedicated access line (DAL) gateway shared among a plurality of enterprise customers, to establish a call with a called station from a calling station in a telephone network associated with one of the enterprise customers;

a signaling interface coupled to the trunk side interface and configured to generate a message according to a prescribed application layer protocol to establish the call with the called station over the data network; and an identifier selection module configured to select an identifier associated with the one enterprise customer, wherein the message includes the identifier is forwarded to a server configured to route the call to the called station based upon the identifier.

51. A system according to claim 50, wherein the application layer protocol includes at least one of a Session Initiation Protocol and H.323 protocol.

52. A system according to claim 50, wherein the identifier is an alias host address.

53. A system according to claim 52, wherein the alias host address is mapped by a name server to a host address associated with the server.

54. A system according to claim 53, wherein the name server stores a plurality of alias host addresses corresponding to the enterprise customers, each of the plurality of alias host addresses mapping to the host address of the server.

55. A system according to claim 50, wherein the trunk side interface couples to a plurality of trunks having corresponding switch identification/trunk-group information, the identifier being based on the switch identification/trunk-group information.

56. A system according to claim 50, wherein the identifier includes a host field to identity the server, and a user field to specify the one customer associated with the calling station.

57. A system according to claim 50, further comprising:

a voice response and prompting module coupled to the trunk side interface and configured to collect digits from the calling station, the alias host address being based on the collected digits.

* * * * *